(12) United States Patent
Hamilton

(10) Patent No.: US 7,671,938 B2
(45) Date of Patent: Mar. 2, 2010

(54) TRANSFLECTIVE LIQUID CRYSTAL DISPLAY

(75) Inventor: Rick Hamilton, Hants (GB)

(73) Assignee: Merck Patent GmbH, Darmstadt (DE)

( * ) Notice: Subject to any disclaimer, the term of this patent is extended or adjusted under 35 U.S.C. 154(b) by 315 days.

(21) Appl. No.: 11/721,878

(22) PCT Filed: Nov. 22, 2005

(86) PCT No.: PCT/EP2005/012479

§ 371 (c)(1),
(2), (4) Date: Jun. 15, 2007

(87) PCT Pub. No.: WO2006/063663

PCT Pub. Date: Jun. 22, 2006

(65) Prior Publication Data

US 2009/0262284 A1    Oct. 22, 2009

(30) Foreign Application Priority Data

Dec. 18, 2004    (EP) .................................. 04030072

(51) Int. Cl.
*G02F 1/1335*    (2006.01)
(52) U.S. Cl. ...................... 349/106; 349/108; 349/114

(58) Field of Classification Search ......... 349/106–111, 349/96
See application file for complete search history.

(56) References Cited

U.S. PATENT DOCUMENTS

| | | | |
|---|---|---|---|
| 7,030,946 B2 * | 4/2006 | Iijima et al. | 349/106 |
| 7,339,642 B2 * | 3/2008 | Iijima et al. | 349/114 |
| 7,345,721 B2 * | 3/2008 | Ting et al. | 349/114 |
| 7,463,319 B2 * | 12/2008 | Roh | 349/114 |
| 7,483,099 B2 * | 1/2009 | Kamijo et al. | 349/114 |
| 7,564,521 B2 * | 7/2009 | Hinata et al. | 349/114 |

FOREIGN PATENT DOCUMENTS

| WO | WO 03/019276 A | 3/2003 |
|---|---|---|
| WO | WO 2005/085941 A | 9/2005 |

OTHER PUBLICATIONS

Roosendal S J et al., Novel High Performance Transflective LCD with a Patterned Retarder, 2003 SID International Symposium Digest of Technical Papers, May 20, 2003, pp. 79-81, vol. 3.

* cited by examiner

*Primary Examiner*—Akm E Ullah
(74) *Attorney, Agent, or Firm*—Millen, White, Zelano & Branigan, P.C.

(57) ABSTRACT

The invention relates to a transflective liquid crystal display (LCD) comprising a patterned quarter wave foil (QWF) and having improved chromaticity.

20 Claims, 4 Drawing Sheets

TRANSFLECTIVE LIQUID CRYSTAL DISPLAY

FIELD OF THE INVENTION

The invention relates to a transflective liquid crystal display (LCD) comprising a patterned quarter wave foil (QWF) and having improved chromaticity.

BACKGROUND AND PRIOR ART

The demand for colour mobile displays that are thin, light weight, low power, but clear and bright in all ambient light conditions has been increasing due to the increasing popularity of mobile phones, personal digital assistants (PDAs), digital cameras and laptop computers. The fact that these devices are required to work in varied ambient conditions and need high battery power has raised interest in transflective colour liquid crystal displays, which use a backlight to illuminate the display, but can reduce power consumption by making use of the ambient light in bright conditions.

In prior art transflective displays of twisted and non-twisted modes like TN (twisted nematic) and ECB (electrically controlled birefringence) are disclosed, wherein each pixel is split into a reflective and a transmissive subpixel (see for example Kubo et al., IDW 1999, page 183-187; Baek et al., IDW 2000, page 41-44; Roosendaal et al., SID Digest 2003, page 78-81 and WO 2003/019276 A2). The transmissive subpixel has transparent front and back electrodes whereas the reflective subpixel has a transmissive front electrode and a reflective back electrode, requiring a patterned electrode structure which is achieved for example by "hole-in-mirror" technology.

As the transmissive mode uses half-wave ($\lambda/2$) optical modulation ($\lambda$=wavelength of incident light) and the reflective mode uses quarter wave ($\lambda/4$) optical modulation it was suggested to use a different cell gap (or LC layer thickness) for the subpixels, so that the reflective subpixel has about half the cell gap of the transmissive subpixel.

In order to make the reflective sub-pixel work with the transmissive subpixel, an achromatic (or "wide-band") quarter wave foil (AQWF) is required to produce circularly polarised light (an AQWF exhibits an optical retardation of $\lambda/4$ for a wide wavelength band preferably encompassing the entire visible spectrum, and is formed for example by combining a QWF with a half wave foil (HWF, having an optical retardation of $\lambda/2$)). The AQWF also covers the transmissive pixel, hence requiring that an equivalent AQWF is placed on the backlight side of the cell.

However, the use of circularly polarised light in the transmissive portion of the display has the disadvantageous side-effect that twisted LC modes are less efficient at converting circular polarised light to the opposite handedness, thus reducing the brightness of the display and making the 90° twisted mode less effective.

To address the problems with circularly polarised light in the transmissive portion of the transflective display, it was proposed to use a patterned QWF having a pattern of areas with QWF retardation covering the reflective subpixels and non-retarding areas covering the transmissive subpixels (WO 03/019276; Van der Zande et al., Proc. of the SID 2003, page 194-197). This allows the reflective and transmissive subpixels to be optimised separately and hence allows the use of linearly polarised light in the transmissive portion.

Reducing the number of films and manufacturing process steps in a display is of great importance to reduce cost and make the manufacturing process easier. The ideal situation would be to develop a patterned AQWF, as this would mean that the transmissive and reflective portions of the display could be optimised independently and no unnecessary films would be required on the backlight side of the cell, reducing the number of films by two. However, there are great technical difficulties of patterning two layers that are aligned at different angles. Therefore, the use of a single patterned QWF would be preferred. This introduces the problem of how to achieve an achromatic reflective mode. This can be achieved by using an external HWF that will combine with the patterned QWF to produce an AQWF, but this affects the contrast and colour of the transmissive state, hence a second HWF is required on the backlight side to compensate (see Roosendaal et al., Proceedings of the SID 2003, page 78-81). On the other hand, using a patterned transflective 90° twist cell with a single patterned QWF in a standard set up produces too great an angular colour shift and reduces reflective contrast.

Hence, there is still a need for a transflective display comprising a patterned QWF which does not have the drawbacks of prior art displays described above.

It was an aim of the present invention to provide a display that does not have the above mentioned disadvantages, shows high contrast, good brightness and low colour shift over a large range of viewing angles and is easy to manufacture in a time- and cost-effective way. Other aims of the present invention are immediately evident to the person skilled in the art from the following detailed description.

The inventors of the present invention have found that these aims can be achieved by providing displays according to the present invention. These displays use a specific combination of a 90°-twisted transflective cell with a patterned QWF that produces reduced chromaticity in the reflective mode, without the need for a half wave foil to complete the AQWF. Rotation of the 90°-twisted cell relative to the polarisers, so that the director of the LC molecules at the surface of the LC cell is oriented at specific angles relative to the polarisation direction of the respective adjacent polariser, effectively reduces or cancels the chromaticity due to the single chromatic QWF.

DEFINITION OF TERMS

The term 'film' includes rigid or flexible, self-supporting or free-standing films with mechanical stability, as well as coatings or layers on a supporting substrate or between two substrates.

The term 'liquid crystal or mesogenic material' or 'liquid crystal or mesogenic compound' means materials or compounds comprising one or more rod-shaped, board-shaped or disk-shaped mesogenic groups, i.e. groups with the ability to induce liquid crystal (LC) phase behaviour. LC compounds with rod-shaped or board-shaped groups are also known in the art as 'calamitic' liquid crystals. LC compounds with a disk-shaped group are also known in the art as 'discotic' liquid crystals. The compounds or materials comprising mesogenic groups do not necessarily have to exhibit an LC phase themselves. It is also possible that they show LC phase behaviour only in mixtures with other compounds, or when the mesogenic compounds or materials, or the mixtures thereof, are polymerised.

For the sake of simplicity, the term 'liquid crystal material' is used hereinafter for both mesogenic and LC materials.

Polymerisable compounds with one polymerisable group are also referred to as 'monoreactive' compounds, compounds with two polymerisable groups as 'direactive' compounds, and compounds with more than two polymerisable groups as 'multireactive' compounds. Compounds without a polymerisable group are also referred to as 'non-reactive' compounds.

The term 'reactive mesogen' (RM) means a polymerisable mesogenic or liquid crystal compound.

The term 'director' is known in prior art and means the preferred orientation direction of the long molecular axes (in case of calamitic compounds) or short molecular axis (in case of discotic compounds) of the mesogenic groups in an LC material.

In films comprising uniaxially positive birefringent LC material the optical axis is usually given by the director.

The term 'homeotropic structure' or 'homeotropic orientation' refers to a layer of LC molecules oriented substantially perpendicular to the plane of the layer.

The term 'planar structure' or 'planar orientation' refers to a layer of LC molecules oriented substantially parallel to the plane of the layer.

Unless stated otherwise, the term "polarisation direction" of a linear polariser means the polariser extinction axis. In case of stretched plastic polariser films comprising e.g. dichroic iodine based dyes the extinction axis usually corresponds to the stretch direction.

SUMMARY OF THE INVENTION

The invention relates to a transflective liquid crystal display (LCD), preferably of the twisted nematic (TN) mode, comprising one or more pixels that are divided into a reflective and a transmissive subpixel and comprise
- an LC layer sandwiched between a front and a back electrode, being switchable between different orientations upon application of an electric field and having a twist angle $\phi$ when no field is applied,
- a front and a back polariser sandwiching the LC layer and having front and back polarisation directions,
- at least one quarter wave retardation film (QWF) between the front polariser and the LC layer, which has an optical axis parallel to its film plane, comprises a pattern of regions with quarter wave ($\lambda/4$) retardation and regions with substantially no retardation, and is arranged such that the $\lambda/4$-regions do essentially cover only the reflective subpixels, characterized in that
- the optical axis of the QWF is oriented at an angle of approximately 45° to the front and back polariser direction,
- the director of the LC layer at the surface facing the front electrode is oriented at an angle $\theta 1$ from 5° to 45° relative to the polarisation direction of the front polariser, and
- the director of the LC layer at the surface facing the back electrode is oriented at an angle $\theta 2$ from 5° to 45° relative to the polarisation direction of the back polariser.

DETAILED DESCRIPTION OF THE INVENTION

Figure 1:
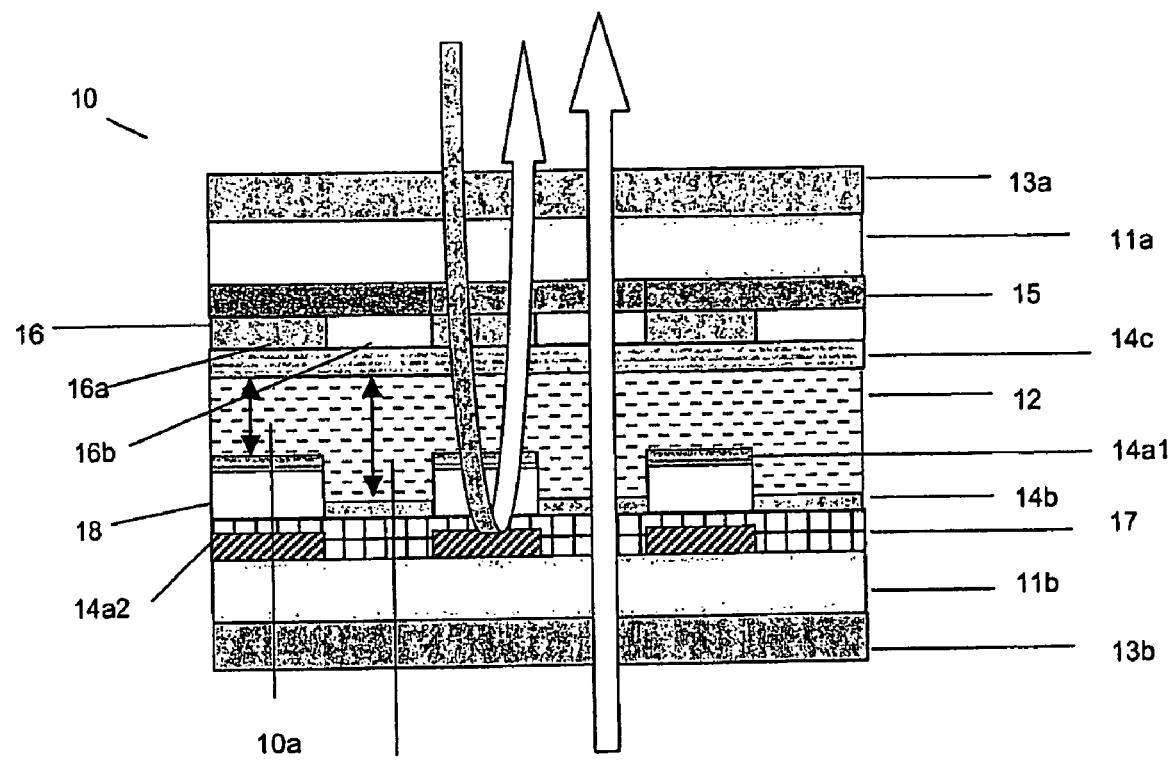
FIG. 1 shows a transflective LCD according to the present invention.

In a display according to the present invention, in the field-off state the LC layer has planar and twisted orientation, i.e. the LC molecules are oriented parallel to the plane of the layer and twisted at an angle $\phi$ around an axis perpendicular to the layer. The LC layer typically comprises LC molecules with positive dielectric anisotropy, which upon application of an electric field are switched into homeotropic or tilted homeotropic orientation, i.e. they are perpendicular or oriented at a tilt angle relative to the plane of the layer.

The LC display according to the present invention is preferably a twisted nematic (TN) display having a twist angle $\phi$ from 40° to 110°, very preferably from 80° to 100°, in particular of 90°. Another preferred embodiment relates to highly twisted nematic (HTN) displays having a twist angle $\phi$ from >90° to <270°, preferably of 180°. Another preferred embodiment relates to supertwisted nematic (STN) displays having a twist angle $\phi$ from >180° to <360°, preferably of 270°.

The patterned QWF comprises regions having a defined on-axis retardation and regions having a different or no on-axis retardation. In the retarding regions of the film the optical axis is preferably parallel to the film plane (A-plate symmetry). In the non-retarding regions the film comprises for example an optically isotropic material, or the optical axis is for example perpendicular to the film plane (C-plate symmetry).

The patterned QWF is preferably provided between the substrates forming the switchable LC cell and containing the switchable LC medium ("incell" application). Compared to conventional displays where optical retarders are usually placed between the LC cell and the polarisers, incell application of an optical retarder has several advantages. For example, a display where the optical retarder is attached outside of the glass substrates forming the LC cell usually suffers from parallax problems, which can severely impair viewing angle properties. If the retarder is prepared inside the LC display cell, these parallax problems can be reduced or even avoided.

Preferably the QWF is positioned between the colour filter and the LC medium, very preferably between the colour filter and the corresponding proximate electrode layer, or if a planarisation layer is present, between the colour filter and the planarisation layer.

The thickness of the QWF is preferably from 0.5 to 3.5 microns, very preferably from 0.6 to 3 microns, most preferably from 0.7 to 2.5 microns.

The on-axis retardation (i.e. at 0° viewing angle) of the QWF is preferably from 90 to 200 nm, most preferably from 100 to 175 nm.

A preferred LCD according to the invention comprises
- an LC cell comprising the following elements
  - a first and a second substrate plane parallel to each other, at least one of which is transparent to incident light,
  - an array of nonlinear electric elements provided on one of said substrates which can be used to individually switch individual pixels of said LC cell, said elements being preferably active elements like transistors, very preferably TFTs, a colour filter array provided on one of said substrates, preferably on the substrate opposite to that carrying the array of nonlinear elements, and having a pattern of different pixels transmitting one of the primary colours red, green and blue (R, G, B), said colour filter optionally being covered by a planarisation layer, a first electrode layer provided on the inside of said first substrate, a second electrode layer provided on the inside of said second substrate, optionally first and second alignment layers provided on said first and second electrodes, an LC layer sandwiched between the electrodes or alignment layers, which is switchable between different orientations by application of an electric field and has a twist angle φ when no field is applied, a first linear polariser on the first side of the LC cell, a second linear polariser on the second side of the LC cell, and at least one QWF positioned between the first and second substrate of the LC cell, having an optical pattern of regions having different retardation, wherein the orientation directions of the polarisers, QWF and LC layer are as defined above and below.

The assembly of an LCD according to a preferred embodiment of the present invention is schematically depicted in FIG. 1. The top of FIG. 1 corresponds to the front side of the display, i.e. the side of the viewer. The bottom of FIG. 1 corresponds to the back side of the display, i.e. the side of the backlight. FIG. 1 exemplarily shows one pixel 10 of the LCD, comprising a layer of a switchable LC medium 12 confined between two transparent, plane parallel substrates 11a/b, like for example glass substrates, and two polarisers 13a/b with crossed polarisation directions sandwiching the substrates.

The display further comprises a transparent electrode 14c on the front side of the LC layer and a pattern of reflective electrodes 14a and transparent electrodes 14b on the back side of the LC layer, thereby forming two sets of reflective subpixels 10a and transmissive subpixels 10b. The transparent electrodes 14c/14b are for examples layers of Indium Tin Oxide (ITO). The reflective electrode 14a comprises for example an ITO layer 14a1 and a reflective layer 14a2 which redirects light transmitted through the LC medium back towards the viewer (indicated by the curved arrow). The reflective layer 14a2 is for example a metal layer (e.g. Al) or can be formed as a mirror with holes (the mirror areas being in the reflective subpixels and the holes in the transmissive subpixels). The electrode layer 14a1 and the mirror 14a2 can be adjacent layers, or spatially separated as shown in FIG. 1.

The display further comprises a colour filter 15 with red, green and blue pixels and a patterned incell QWF 16. The QWF 16 has a pattern of regions 16a having a defined retardation (with a value <0 or >0) and regions 16b having no on-axis retardation. The retarding regions 16a cover the reflective subpixels 10a and the non-retarding regions 16b cover the transmissive subpixels 10b.

If the display is of the active-matrix type, as shown in FIG. 1, it also comprises an array of nonlinear electric elements 17 which are used to individually switch individual pixels, like for example TFTs, on one side of the LC cell, preferably on the side opposite to that of the colour filter 15. It is possible that the TFT layer 17 is on the back side and the colour filter 15 on the front side, as shown in FIG. 1, or vice versa.

In colour active matrix displays, the mirror 14a2 can be built for example on the TFT layer (if the colour filter is on the front substrate) or on the colour filter layer (if the TFT layer is on the front substrate).

The reflective and transmissive subpixels 10a/b preferably have different cell gaps, as indicated by the double arrows in FIG. 1. Preferably the cell gap of the transmissive subpixel 10b is two times the cell gap of the reflective subpixel 10a.

To achieve a different cell gap, the reflective subpixel comprises for example a step 18 which can be formed e.g. from a clear resin (like a photoresist). The step 18 can be present on the colour filter side of the LC layer, or on the side of the LC layer opposite to that of the colour filter as shown in FIG. 1.

The electrodes 14a/b/c may also be covered by alignment layers (not shown) to induce or enhance the desired surface alignment in the LC medium 12. Optionally there is also an alignment layer (not shown) provided between the colour filter 15 and the patterned incell QWF 16. The display also comprises a backlight (not shown) on its back side.

The linear polarisers 13a/b are for example standard absorption polarisers comprising e.g. stretched, dye-doped plastic films. It is also possible to use linear polarisers comprising a polymerised LC material with uniform planar orientation and a dichroic dye absorbing visible light, as described for example in EP-A-0 397 263. The polarisers 13a/b can be attached to the substrates 11a/b by adhesive layers (not shown), like commercially available PSA films (pressure sensitive adhesives).

The operation of a transflective LCD according to the present invention and as shown in FIG. 1 is exemplarily described below for 90° twist angle and a patterned incell QWF 16 having QWF regions 16a and zero retardation regions 16b.

In the bright state (without an electric field applied) in the reflective subpixels 10a ambient light entering the display from the top is polarised by the front linear polariser 13a. The linear polarised light is converted to circularly polarised light by the QWF regions 16a of the patterned incell retarder and passes through the LC medium 12.

Due to the smaller cell gap of the reflective subpixel, which is preferably half the cell gap of the transmissive subpixel, light passing the LC medium 12 experiences a retardation of $d/2 \cdot \Delta n$, wherein d is the cell gap and $\Delta n$ is the birefringence of the LC medium. As a consequence the circularly polarised light is converted into substantially linear polarised light. Depending on the cell parameters the light may not be completely linear but slightly elliptically polarised.

The mirror 14a2 reflects the light back while preserving its polarisation state and direction. The light passes again through the LC medium 12 where it is converted back to circularly polarised light, and passes again through the patterned incell QWF 16 which converts it to linear polarised light. This linear polarised light can then pass again through the front polariser 13a and is seen by an observer.

The transmissive subpixels in the bright state behave like a standard TN cell. The regions of retarder 16b covering the transmissive subpixels have no on-axis retardation for visible wavelengths and do not change the polarisation state of the light. Thus, light emitted from the backlight enters the display from the back side and is polarised by the back linear polariser 13b. When passing through the LC medium 12 it experiences a retardation of $d \cdot \Delta n$ and remains linear polarised, however its plane of polarisation is twisted at 90° so that it passes the front polariser 13a and is seen by an observer.

In the dark state (with an electric field applied, not shown) in the reflective subpixels ambient light entering from the top is polarised by the front linear polariser 13a. It is converted to circularly polarised light by the patterned incell QWF 16a and passes through the homeotropically oriented LC medium 12 with its polarisation state and direction substantially unchanged. When reflected back from the mirror 14a2 it remains circularly polarised but its polarisation sense is reversed. It is then converted by the patterned incell QWF 16a to linear polarised light, but now with perpendicular polarisation direction so that it is blocked by the crossed front polariser 13a.

In the dark state the transmissive subpixels also behave like a standard TN cell. Light emitted from the backlight is polarised by the back linear polariser 13b and passes through the non-retarding regions of the patterned incell retarder 16b and through the LC medium 12 with its polarisation direction substantially unchanged, so that it is blocked by the crossed front polariser 13a.

A transflective LCD according to the present invention is characterized in that the optical layers like the polarisers, LC layer and QWF, and optional further retardation films, are arranged with their optical axes oriented at specific angles relative to each other. In particular, rotation of the LC layer relative to the polarisers and the QWF effectively reduces the chromaticity caused by the single chromatic QWF. Hence an additional HWF (to form an AQWF) is not necessary and the number of optical layers can be reduced, leading to lower thickness, higher brightness and lower manufacturing cost of the display.

Figure 2:
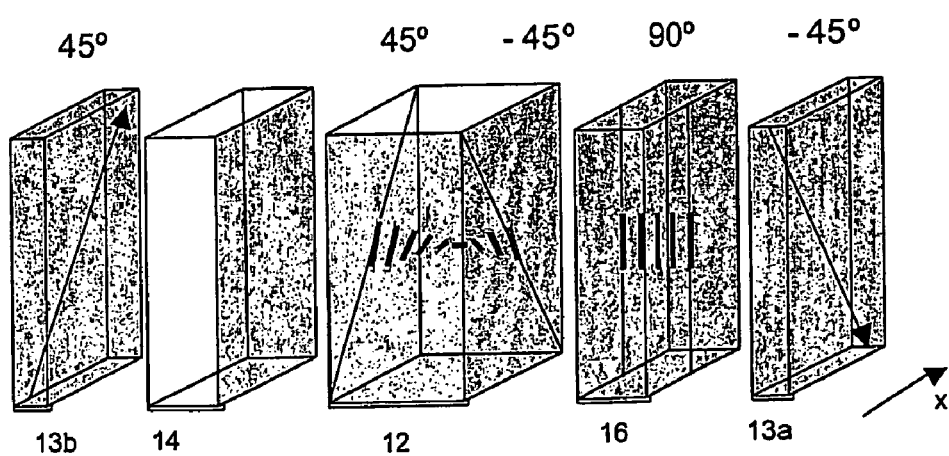
FIG. 2 shows the relative orientation of optical layers in a transflective LCD according to prior art.

The orientation of the optical components in a transflective TN display according to prior art is exemplarily illustrated in FIG. 2, which shows an expanded view of the reflective subpixel in the field-off state, including front and back polarisers 13a/b, a reflector 14, a patterned QWF 16, and a TN cell 12 comprising an LC layer with a twist angle φ of 90° and having a front surface 12a and a back surface 12b. The polarisation directions of the polarisers 13a/b are +45° and −45°, respectively. The optical axis of the QWF 16 is oriented at 90°. All angles are given relative to a reference axis x (direction of 0°) shown in FIG. 2.

The director of the LC layer in the TN cell 12 at the front and back surface 12a/b is oriented at +45° and 45°, i.e. parallel to the respective adjacent polariser transmission axis. This orientation of the LC layer is hereinafter also referred to as 'standard alignment'.

Figure 3:
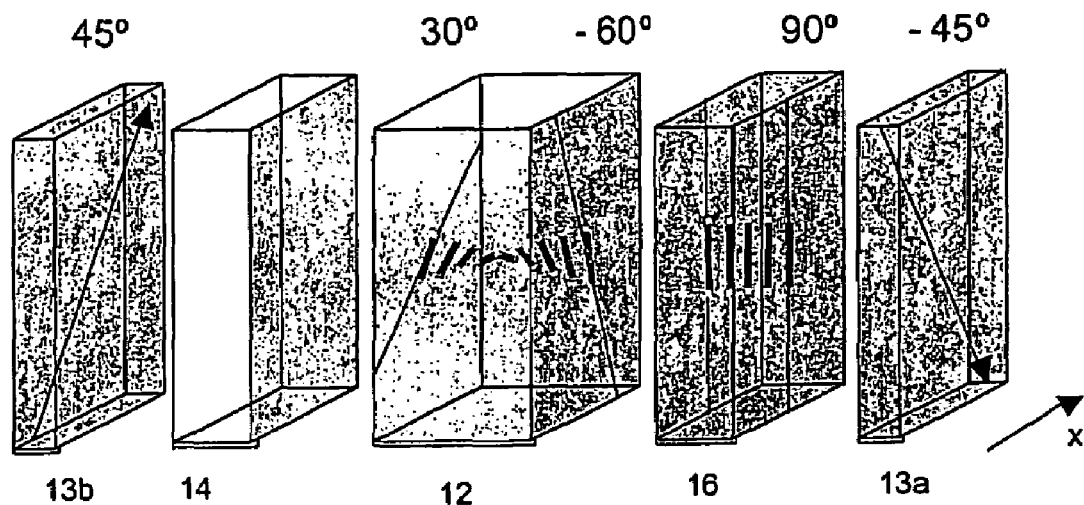
FIG. 3 shows the relative orientation of optical layers in a transflective LCD according to the present invention.

The orientation of the optical components in a transflective TN display according to the present invention is exemplarily illustrated in FIG. 3, which shows an expanded view of a reflective subpixel having the components shown in FIG. 2 in the field-off state. The orientations of the front and back polarisers 13a/b and of the patterned QWF 16 are as shown in FIG. 2. However, the complete TN cell 12 is now rotated at an angle relative to the above described standard alignment.

In the foregoing and the following, this angle is also referred to as 'rotation angle' or θ. In case of a TN display with a twist angle φ of 90° and crossed polarisers, θ corresponds to the angle between the surface director of the LC layer and the polarisation axis of the respective adjacent polariser when no field is applied.

For example, in the preferred embodiment of the present invention as shown in FIG. 3, the rotation angle θ is −15° in the direction of twist (i.e. 15° opposite to the twist direction as the stack is observed from the view point of the user). As the LC layer in the TN mode has a twist angle φ of 90°, the director of the LC layer in the TN cell 12 at the front and back surface 12a/b is now oriented at +30° and −60°, respectively.

In a display according to the present invention, rotation of the LC layer relative to the polarisers allows to reduce the chromaticity of the reflective state and foregoes the need for an achromatic QWF. In particular, the rotation of the LC layer leads to a reduced on-axis and off-axis chromaticity of the display in the reflective mode, whilst maintaining or even improving the brightness of the display. The exact values of the angles θ, θ1 and θ2 can be varied depending on the chromaticity of the QWF used. Thus, chromaticity will increase up to a maximum by increasing the rotation angle θ up to 45°.

In a display according to the present invention, in particular in a TN display, the angles θ, θ1 and θ2 are preferably from 5° to 45°, very preferably from 10° to 20°, most preferably 15°.

The selection and optimization of further display parameters like the cell gap d, the twist angle φ and birefringence Δn of the LC layer, can be achieved as described in prior art.

In a preferred embodiment, the patterned incell QWF additionally exhibits a pattern of R-, G- and B-pixels with three different retardations covering the reflective subpixels, wherein the retardation in the R-, G- and B-pixels of the film is selected such that the efficiency of converting linearly polarised light into circularly polarised light is optimised for the colour red (R), green (G) or blue (B), respectively. The QWF is positioned such that its R-, G- and B-pixels cover the corresponding reflective R,- G- and B-subpixels of the display.

In such a retardation film the retardation values in the R-, G- and B-pixels are preferably selected as follows:

For red light of a wavelength of 600 nm the retardation is from 140 to 190 nm, preferably 145 to 180 nm, very preferably 145 to 160 nm, most preferably 150 nm.

For green light of a wavelength of 550 nm the retardation is from 122 to 152 nm, preferably 127 to 147 nm, very preferably 132 to 142 nm, most preferably 137 nm.

For blue light of a wavelength of 450 nm the retardation is from 85 to 120 nm, preferably 90 to 115 nm, very preferably 100 to 115 nm, most preferably 112 nm.

The QWFs used in the LCD according to this invention are preferably films comprising polymerised LC material, optionally with a retardation and/or orientation pattern. These can be applied incell (i.e. inside the substrates forming the LC cell) to avoid parallax problems and patterned using UV light to form an isotropic region over the transmissive portion of the display. Principally any patterned retarder which is applicable incell can be used as QWF.

Patterned retarders that are suitable for use in the LCD according to the present invention have been described in prior art. For example, the retarders disclosed in WO 2003/019276 A, WO 2004/083913 A and Van der Zande et al., Proceedings of the SID 2003, p. 194-197 can be used.

Especially preferred are patterned optical retardation films as described in WO 2004/090025 A1. Preferably such patterned films are prepared by a process comprising the following steps:

a) providing a layer of a polymerisable LC material comprising at least one photoisomerisable compound onto a substrate, b) aligning the layer of LC material into planar orientation, c) exposing the LC material in the layer, or in selected regions thereof, to photoradiation that causes isomerisation of the isomerisable compound, preferably UV radiation, d) polymerising the LC material in at least a part of the exposed regions of the material, thereby fixing the orientation, and e) optionally removing the polymerised film from the substrate, wherein the retardation and/or orientation of the LC material is controlled by varying the amount and/or type of the photoisomerisable compound, and/or by varying the intensity of the photoradiation and/or the exposure time.

Preferably the LC material is exposed to radiation that causes photoisomerisation and photopolymerisation, wherein the steps of photoisomerisation and photopolymerisation are carried out under different conditions, in particular under different gas atmospheres, especially preferably wherein photoisomerisation is carried out in the presence of oxygen and photopolymerisation is carried out in the absence of oxygen.

Apart from the specific conditions and materials described in this invention, the steps a) to e) can be carried out according to standard procedures that are known to the expert and are described in the literature.

The polymerisable LC material comprises a photoisomerisable compound, preferably a photoisomerisable mesogenic or LC compound, very preferably a photoisomerisable compound that is also polymerisable. The isomerisable compound changes its shape, e.g. by E-Z-isomerisation, when exposed to radiation of a specific wavelength, e.g. UV-radiation. This leads to disruption of the uniform planar orientation of the LC material, resulting in a drop of its birefringence. Since the optical retardation of an oriented LC layer is given as the product d·Δn of the layer thickness d and the birefringence Δn of the LC material, the drop in birefringence also causes a decrease of the retardation in the irradiated parts of the LC material. The orientation and retardation of the LC material is then fixed by in-situ polymerisation of the irradiated regions or of the entire film.

Polymerisation of the LC material is achieved for example by thermal or photopolymerisation. In case photopolymerisation is used, the type of radiation used for photoisomerisation and for photopolymerisation of the LC material may be the same or different. In case radiation, e.g. UV-radiation, of a wavelength is used that can cause both photoisomerisation and photopolymerisation of the LC material, the steps of photoisomerisation and photopolymerisation are preferably carried out under different conditions, in particular under different gas atmospheres. In this case preferably photoisomerisation is carried out in the presence of oxygen, like e.g. in air, and photopolymerisation is carried out in the absence of oxygen, especially preferably under an inert gas atmosphere of e.g. nitrogen or a noble gas like argon. If the isomerisation step is performed in the presence of oxygen or in air, the oxygen scavenges the free radicals produced from the photoinitiator present in the material and thus prevents polymerisation. In the next step oxygen or air is removed and replaced by an inert gas such as nitrogen or argon, thereby allowing polymerisation to occur. This allows better control of the process steps.

The degree of isomerisation and thus the birefringence change in the layer of LC material can be controlled e.g. by varying the radiation dose, i.e. the intensity, exposure time and/or power of the radiation. Also, by applying a photomask between the radiation source and the LC layer it is possible to prepare a film with a pattern of regions or pixels having specific values of the retardation that differ from each other. For example, a film comprised of two different values of retardation can be created using a simple, monochrome mask. A more complicated film exhibiting multiple regions of different retardation can be created using a grey-scale mask. After the desired retardation values are achieved the LC layer is polymerised. In this way it is possible to create a polymer retardation film with values of retardation ranging from that of the initial LC layer to zero. The value of retardation for the initial layer of LC material is controlled by appropriate selection of the layer thickness and the type and amounts of the individual components of the LC material.

The polymerisable LC material is preferably a nematic or smectic LC material, in particular a nematic material, and preferably comprises at least one di- or multireactive achiral RM and optionally one or more than one monoreactive achiral RMs. By using di- or multireactive RMs a crosslinked film is obtained wherein the structure is permanently fixed, and which exhibits high mechanical stability and high stability of the optical properties against external influences like temperature or solvents. Films comprising crosslinked LC material are thus especially preferred.

Polymerizable mesogenic mono-, di- and multireactive compounds used for the present invention can be prepared by methods which are known per se and which are described, for example, in standard works of organic chemistry such as, for example, Houben-Weyl, Methoden der organischen Chemie, Thieme-Verlag, Stuttgart.

Examples of suitable polymerizable mesogenic compounds that can be used as monomers or comonomers in a polymerizable LC mixture are disclosed for example in WO 93/22397, EP 0 261 712, DE 195 04 224, WO 95/22586, WO 97/00600 and GB 2 351 734. The compounds disclosed in these documents, however, are to be regarded merely as examples that shall not limit the scope of this invention.

The examples below serve to illustrate the invention without limiting it. In these examples, all temperatures are given in degrees Celsius and all percentages are given as percentage by weight unless stated otherwise. Simulations of optical performance, like luminance, chromaticity and contrast plots, are carried out using a Berreman 4×4 matrix calculations.

EXAMPLE 1

Preparation of a Patterned QWF

The following polymerisable LC mixture is formulated

| | |
|---|---|
| (13) | 14.4% |
| (24) | 18.0% |
| (35) | 17.0% |
| (46) | 17.0% |
| (57) | 32.0% |
| Irgacure 651 | 1.0% |
| Fluorad FC171 | 0.6% |

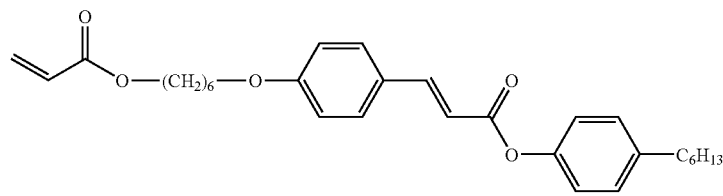

(1)

-continued

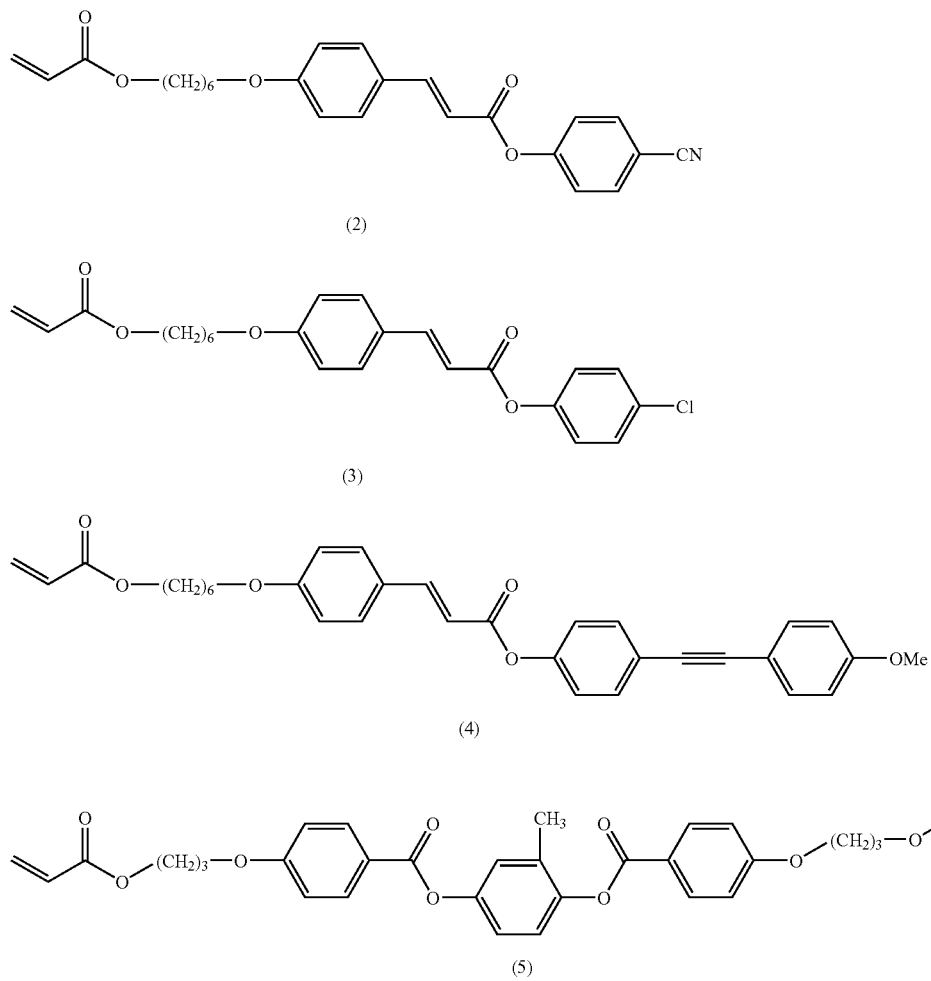

Compounds (1) to (5) are described in prior art. Irgacure 651 is a commercially available photoinitiator (from Ciba AG, Basel, Switzerland). Fluorad FC 171 is a commercially available non-ionic fluorocarbon surfactant (from 3M).

The mixture is dissolved to create a 50 wt % solution in xylene. This solution is filtered (0.2 μm PTFE membrane) and spin coated onto a glass/rubbed polyimide slide (low pretilt polyimide JSR AL1054 from Japan Synthetic Rubber). The coated film is exposed to 20 mWcm$^{-2}$ 365 nm radiation in air through a grey-scale (0:50:100% T) mask.

Subsequently, the film is photopolymerised using 20 mWcm$^{-2}$ UV-A radiation, for 60 seconds in an $N_2$-atmosphere, to give a patterned film having a pattern of regions with different retardations.

EXAMPLE 2

(Comparison Example) Prior Art Transflective TN Display

The optical performance of a prior art pixelated transflective TN LCD with standard alignment of the optical components as described in FIG. 2 is calculated.

Figure 4:
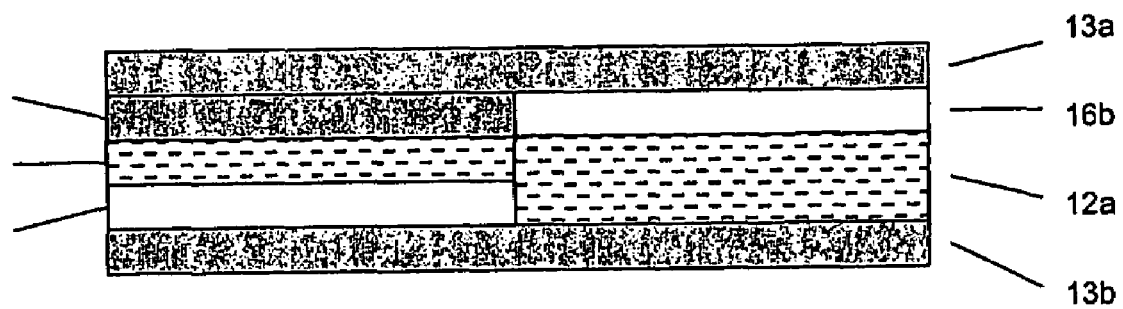
FIG. 4 shows the stack of optical layers in a transflective LCD according to examples 2 and 3.

A cross section of the stack of optical components of the LCD used as basis for the calculation is schematically depicted in FIG. 4, including an LC layer divided into reflective subpixels 12a and transmissive subpixels 12b, front and back polarisers 13a/b, a patterned QWF with quarter wave pixels 16a and optically isotropic pixels 16b, and a reflector 14a.

The parameters of the components are as follows:

| | |
|---|---|
| Front polariser direction: | −45° |
| Back polariser direction: | +45° |
| Twist angle φ of LC layer: | 90° |
| LC director at front surface: | −45° |
| LC director at back surface: | +45° |
| Retardation of LC layer (reflective subpixel): | 238 nm |
| Retardation of LC layer (transmissive subpixel): | 475 nm |
| Optical axis of QWF (reflective subpixel): | +90° |
| Retardation of QWF (reflective subpixel): | 140 nm |

Figure 5A:
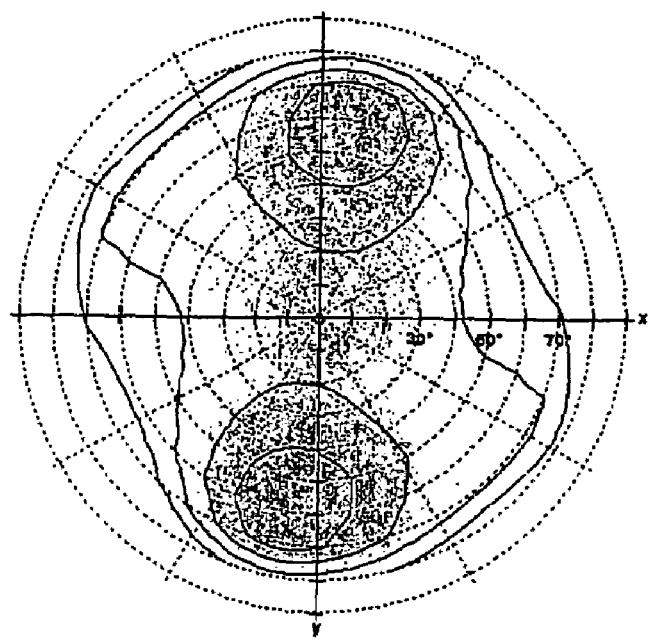
FIGS. 5A and 5B show the calculated angular luminance (A) and chromaticity (B) for a transflective LCD according to example 2.
Figure 5B:
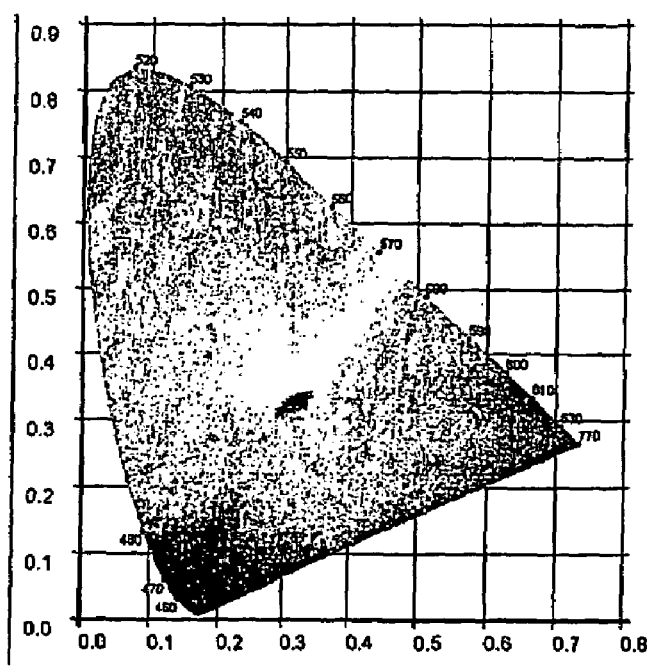

The angular luminance (A) and chromaticity (B) of the display are shown in FIGS. 5A and 5B. The on-axis luminance is 39.5%, the chromaticity is 4.5%.

EXAMPLE 3

Transflective TN Display According to the Invention

The optical performance of a pixelated transflective TN LCD according to the present invention, with alignment of the optical components as described in FIG. 3, is calculated. The stack of optical components is as shown in FIG. 4.

The parameters of the components are as follows:

| | |
|---|---|
| Front polariser direction: | −45° |
| Back polariser direction: | +45° |
| Twist angle φ of LC layer: | 90° |
| Rotation angle θ of LC layer (relative to polarisers): | −15° |
| θ1, θ2: | −15° |
| LC director at front surface: | −60° |
| LC director at back surface: | +30° |
| Retardation of LC layer (reflective subpixel): | 238 nm |
| Retardation of LC layer (transmissive subpixel): | 456 nm |
| Optical axis of QWF (reflective subpixel): | +90° |
| Retardation of QWF (reflective subpixel): | 140 nm |

The patterned QWF can be made for example as described in Example 1.

Compared to Example 2, the reflective TN cell is rotated at an angle θ of −15° in the direction of twist (i.e. 15° opposite to the twist direction as the stack is observed from the view point of the user).

Figure 6A:
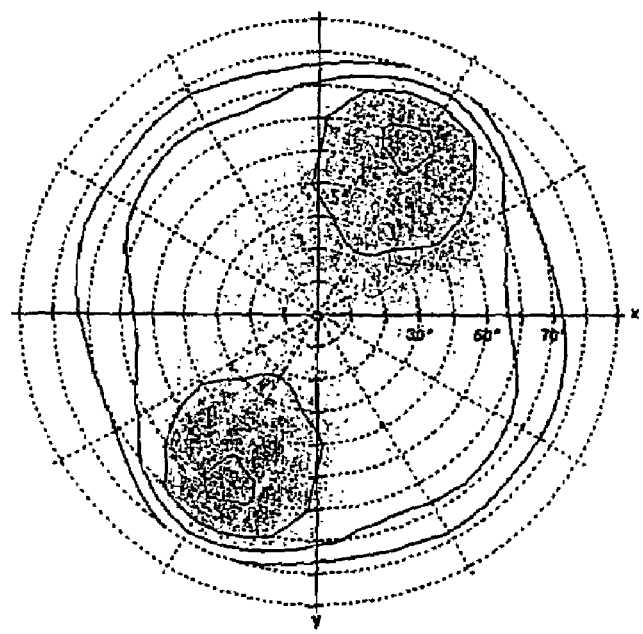
FIGS. 6A and 6B show the calculated angular luminance (A) and chromaticity (B) for a transflective LCD according to example 3.
Figure 6B:
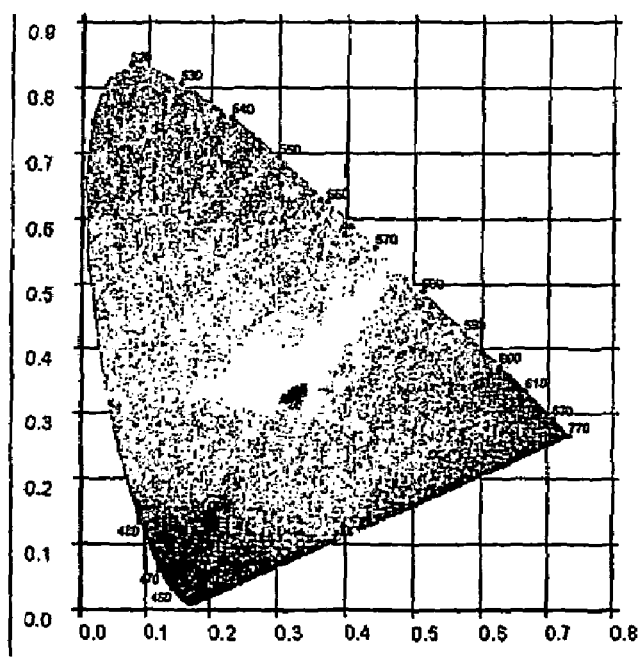

The angular luminance (A) and chromaticity (B) are shown in FIGS. 6A and 6B. The on-axis luminance is 40.8%, the chromaticity is 2.9%. The display has considerably lower chromaticity than that of Example 2, and also improved luminance.

The invention claimed is:

1. A transflective liquid crystal display (LCD) comprising one or more pixels that are divided into a reflective and a transmissive subpixel and comprise
    an LC layer sandwiched between a front and a back electrode, being switchable between different orientations upon application of an electric field and having a twist angle φ when no field is applied,
    a front and a back polarizer sandwiching the LC layer and having front and back polarization directions,
    at least one quarter wave retardation film (QWF) between the front polariser and the LC layer, which has an optical axis parallel to its film plane, comprises a pattern of regions with quarter wave (λ/4) retardation and regions with substantially no retardation, and is arranged such that the λ/4-regions do essentially cover only the reflective subpixels,
    wherein
    the optical axis of the QWF is oriented at an angle of approximately 45° to the front and back polarizer direction,
    the director of the LC layer at the surface facing the front electrode is oriented at an angle θ1 of from 5 to 45° relative to the polarization direction of the front polarizer, and
    the director of the LC layer at the surface facing the back electrode is oriented at an angle θ2 of from 5 to 45° relative to the polarization direction of the back polarizer.

2. LCD according to claim 1, which has a twist angle φ from 40° to 110°.

3. LCD according to claim 1, which has a twist angle φ of 90°.

4. LCD according to claim 1, wherein θ1 and θ2 are from 10° to 20°.

5. LCD according to claim 1, wherein θ1 and θ2 are 15°.

6. LCD according to claim 1, wherein the thickness of the QWF is from 0.5 to 3.5 microns.

7. LCD according to claim 1, wherein the on-axis retardation of the QWF is from 100 to 175 nm.

8. LCD according to claim 1, which it comprises
    a liquid crystal (LC) cell comprising the following elements
    a first and a second substrate plane parallel to each other, at least one of which is transparent to incident light,
    an array of nonlinear electric elements provided on one of said substrates which can be used to individually switch individual pixels of said LC cell, like transistors,
    a color filter array provided on one of said substrates, and having a pattern of different pixels transmitting one of the primary colors red, green and blue (R, G, B), said color filter optionally being covered by a planarization layer,
    a first electrode layer provided on the inside of said first substrate,
    optionally a second electrode layer provided on the inside of said second substrate,
    optionally first and second alignment layers provided on said first and second electrodes,
    an LC layer sandwiched between the electrodes or alignment layers, which is switchable between different orientations by application of an electric field and has a twist angle φ when no field is applied,
    a first linear polarizer on the first side of the LC cell,
    a second linear polarizer on the second side of the LC cell, and
    at least one QWF.

9. LCD according to claim 1, wherein the QWF is positioned between the color filter and the proximate electrode.

10. LCD according to claim 1, which comprises a color filter having a pattern of R-, G-, B-pixels, and the QWF exhibits a pattern of R-, G- and B-pixels having different retardation that is adjusted such that the efficiency of converting linearly polarized light into circularly polarized light is optimized for the color R, G and B, respectively, said QWF being positioned such that each of its R-, G- and B-pixels covers the corresponding R-, G- and B-pixels of the color filter.

11. LCD according to claim 2, wherein θ1 and θ2 are from 10° to 20°.

12. LCD according to claim 2, wherein θ1 and θ2 are 15°.

13. LCD according to claim 2, wherein the thickness of the QWF is from 0.5 to 3.5 microns.

14. LCD according to claim 2, wherein the on-axis retardation of the QWF is from 100 to 175 nm.

15. LCD according to claim 3, wherein θ1 and θ2 are from 10° to 20°.

16. LCD according to claim 3, wherein θ1 and θ2 are 15°.

17. LCD according to claim 3, wherein the thickness of the QWF is from 0.5 to 3.5 microns.

18. LCD according to claim 3, wherein the on-axis retardation of the QWF is from 100 to 175 nm.

19. LCD according to claim 16, wherein the thickness of the QWF is from 0.5 to 3.5 microns.

20. LCD according to claim 16, wherein the on-axis retardation of the QWF is from 100 to 175 nm.

* * * * *

UNITED STATES PATENT AND TRADEMARK OFFICE
CERTIFICATE OF CORRECTION

PATENT NO. : 7,671,938 B2
APPLICATION NO. : 11/721878
DATED : March 2, 2010
INVENTOR(S) : Rick Hamilton It is certified that error appears in the above-identified patent and that said Letters Patent is hereby corrected as shown below:

In the drawings:
Figure 4 shows

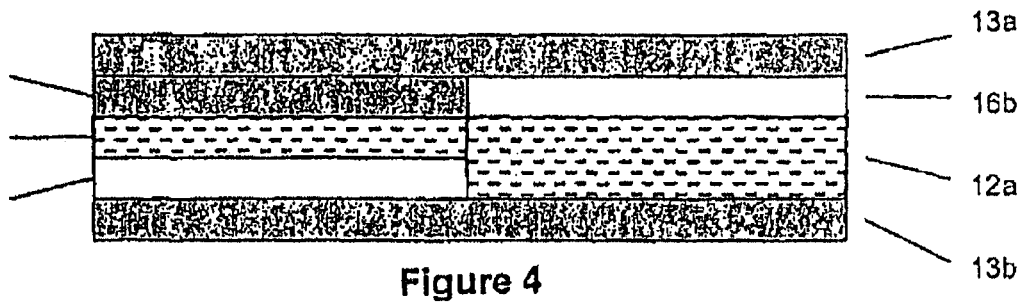

Figure 4 please replace with

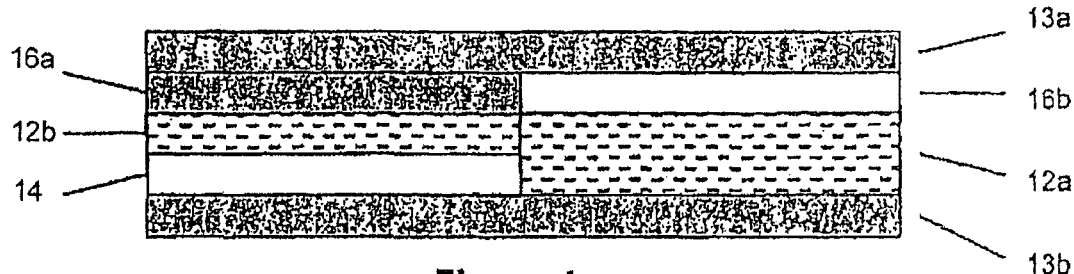

Figure 4

Column 14, line 16 reads "8. LCD according to claim 1, which it comprises" should read
--8. LCD according to claim 1, which comprises--

Signed and Sealed this

Fifth Day of October, 2010

David J. Kappos
*Director of the United States Patent and Trademark Office*